United States Patent [19]

Williamson

[11] 4,148,693
[45] Apr. 10, 1979

[54] HORIZONTAL CYLINDRICAL DISTILLATION APPARATUS

[76] Inventor: William R. Williamson, Rte. 1, Box 4N, Mary Esther, Fla. 32569

[21] Appl. No.: 769,695

[22] Filed: Feb. 17, 1977

Related U.S. Application Data

[63] Continuation of Ser. No. 553,114, Feb. 26, 1975, abandoned.

[51] Int. Cl.² .............................................. C02B 1/06
[52] U.S. Cl. .................................... 202/173; 202/180; 202/181; 202/197; 203/11; 203/22; 203/24; 203/80; 203/88
[58] Field of Search ................ 202/172, 173, 174, 193, 202/180, 181, 197; 203/7, 11, 26, 73, 80, 88, 24, 22, 40

[56] References Cited

U.S. PATENT DOCUMENTS

| | | | |
|---|---|---|---|
| 2,759,882 | 8/1956 | Worthen | 202/174 |
| 2,959,524 | 11/1960 | Goeldner | 202/173 |
| 3,416,318 | 12/1968 | Chocquet | 202/174 |
| 3,418,213 | 12/1968 | Williamson | 202/173 |
| 3,489,650 | 1/1970 | Williamson | 202/173 |
| 3,595,758 | 7/1971 | Deputy, Jr. et al. | 202/173 |
| 3,730,848 | 5/1973 | Kowalski | 202/173 |
| 3,809,623 | 5/1974 | Sasakura et al. | 202/173 |
| 3,856,630 | 12/1974 | Gilbert | 202/173 |
| 4,035,243 | 7/1977 | Katz et al. | 203/24 |

Primary Examiner—Wilbur L. Bascomb, Jr.
Attorney, Agent, or Firm—Kenneth E. Darnell

[57] ABSTRACT

The invention provides unusally efficient distillation apparatus configured into a compact structure which conserves material in its construction and power consumption in its operation. The present structure particularly provides horizontally disposed flash effect distillation chambers coupled "back-to-back" across a common wall, the chambers being operable as a distillation system for water purification and/or solute concentration or as a sub-system in multi-effect distillation systems.

7 Claims, 2 Drawing Figures

HORIZONTAL CYLINDRICAL DISTILLATION APPARATUS

This is a continuation of application Ser. No. 553,114, filed Feb. 26, 1975, the prior application being abandoned.

BACKGROUND AND SUMMARY OF THE INVENTION

The invention relates to distillation systems generally and particularly to distillation systems of the "flash" variety where pure water is recovered from sea water, from other solute-laden water, and/or from waters contaminated with various chemical and/or physical pollutants. The invention can further be used as a distiller-concentrator to produce an effluent which is more concentrated in a given solute.

Flash distillation apparatus of the type described have generally been constructed with flat steel sheets enclosing heat exchange apparatus. Materials such as copper, nickel or titanium, while desirable as materials for use in such structures, require uneconomical heavy wall construction when used as flat sides in apparatus of this type. Steel stiffeners must also be employed, requiring welding of dissimilar metals, even at relatively low operating pressures. The present apparatus is particularly suited to use of these relatively exotic and expensive materials since a minimum of the material need be used to provide a structure with sufficient integrity to withstand the increasingly high pressures and operating temperatures employed not only in present-day distillation systems, but also in presently experimental systems which will likely be "on-line" in the near future. A variety of materials may be used in the fabrication of the present apparatus and, due to the particular structure thereof, these materials may be mixed without disadvantageous galvanic effects, without assembly difficulties, and without compromise of structural integrity. Such materials include but are not limited to various plastics, reinforced fiber-glass, and presently available coated steels. It is of particular note that the present invention provides economies of construction, not only in pecuniary terms but also in terms of efficient use of materials, which also provide operating economies in terms of product output per unit of power input.

Advancing process technologies such as the method of preventing scale information at high operational temperatures disclosed by E.A. Cadwallader and me in co-pending U.S. patent application Ser. No. 503,108 now abandoned, increase corrosion in steel enclosure vessels despite the use of coatings. Thus, the ability to use economically materials such as titanium to contact sea water as is provided by the present invention is of great importance in the art. The invention further provides the advantages of being easily combinable into multi-effect distillation systems of widely varying capacities and of being volumetrically efficient. The "back-to-back" arrangement of the flash chambers comprising the present apparatus allows a compact horizontal arrangement requiring substantially less space than conventional vertically disposed, multichambered distillation apparatus of similar capacity. A further advantage in material usage and economy of operation of the inventon lies in conforming the present evaporating chambers without heat exchange sections in the chambers. Thus, heating coils such as are disclosed by me in U.S. Pat. No. 3,302,373 need not be disposed in the present evaporating chambers.

The higher operating pressures permitted by the present cylindrically conformed apparatus coupled with the fact that said apparatus is in contact with sea water requires the use of expensive and strategically critical materials in the fabrication of the apparatus. When compared to present day rectangular evaporator construction, the design of the present apparatus greatly reduces weight and material cost. The higher operating pressure also makes possible external ducting of the vapor (due to the greatly reduced volume of the evaporator) to a composite heat exchanger, thereby resulting in a 40% saving over the cost of separate individual staged heat exchangers embodied in the flash chambers of prior designs.

The invention can further be used to provide a "topping effect" to existing low temperature distilling plants. Present distillers operate between a top temperature of 190° F. and a low temperature of 100° F. The present horizontally-disposed cylindrical back-to-back configuration can be coupled in series (MSF), in parallel (MEF), or both (MEMS) to optimize stages and/or effects and also to operate between at least 285° F. and 195° F. Thus, the operating temperature range is doubled, the efficiency of existing plants being more than doubled. The additional capital investment would be amortized quickly at the present cost of energy.

The invention further allows the use of light gauge, "non-pressure" parts for fabrication of a composite flash and mesh separator device. Due to the essentially unitary construction of this composite device, repair or replacement is quickly accomplished by simple unbolting of the device from the evaporator chamber. Further, if scaling occurs, all components of the evaporator can be easily disassembled for cleaning. In prior art evaporators, the flash device is an integral part of the flash chamber. Thus, the only way to make repairs is by cutting through the pressure enclosure or by providing access doors in small plants or man-ways in large plants. All of these prior practices have proven costly and time-consuming.

The invention further provides a flash device which exposes both the top and bottom of the "sheet" of sea water or bine to evaporation, thus having the effect of reducing the size of the flash chamber in half for the same release rate in pounds of vapor per square foot of surface exposed. In prior art flash evaporators, only the top surface is exposed to evaporation.

The present apparatus further acts to reduce the size of the mesh separator by interposing several reversals of flow in order to separate water droplets from vapor. These several changes of direction also has the effect of reducing not only the "escape height" (which increases the normal height of the plant) but also the size of the mesh necessary for effective separation of brine from vapor since water loading on the mesh is reduced. The mesh is located directly above the flashing pool of liquid in present designs, direct impingement (especially with foaming liquids) of water droplets on the mesh therefore occurring.

The present invention also utilizes a division plate between stages which is exposed to only pure vapor. Since a temperature gradient exists between stages, the contact of the division plate with only pure vapor prevents deposition of scale on the division plate. In prior evaporators, the dividing structure between "hot" and "cold" chambers lies in the brine flow path, the brine on the "colder" side hitting the dividing structure and evaporating to deposit salt and scale which "creeps" up the hot surface, by-passes the separators, and thus causes carry-over of impurities. The present conformation is particularly useful with the use of $CO_2$ as a scale inhibitor. In prior evaporators, the use of $CO_2$ would necessitate the use of double, insulated walls between stages, thereby resulting in a more costly structure.

Accordingly, it is an object of the invention to provide evaporator-concentrator apparatus which can be economically fabricated from a variety of materials, including relatively expensive corrosion-resistant metals.

It is a further object of the invention to provide multi-effect distillation apparatus having horizontally disposed, back-to-back evaporating chambers.

It is another object of the invention to provide material and energy efficient distillation apparatus which is combinable into distillation systems of varying capacity with maximal volumetric efficiency.

Further objects and advantages of the invention will become apparent in light of the following detailed description of the preferred embodiments of the invention.

DESCRIPTION OF THE PREFERRED EMBODIMENTS

Figure 1:
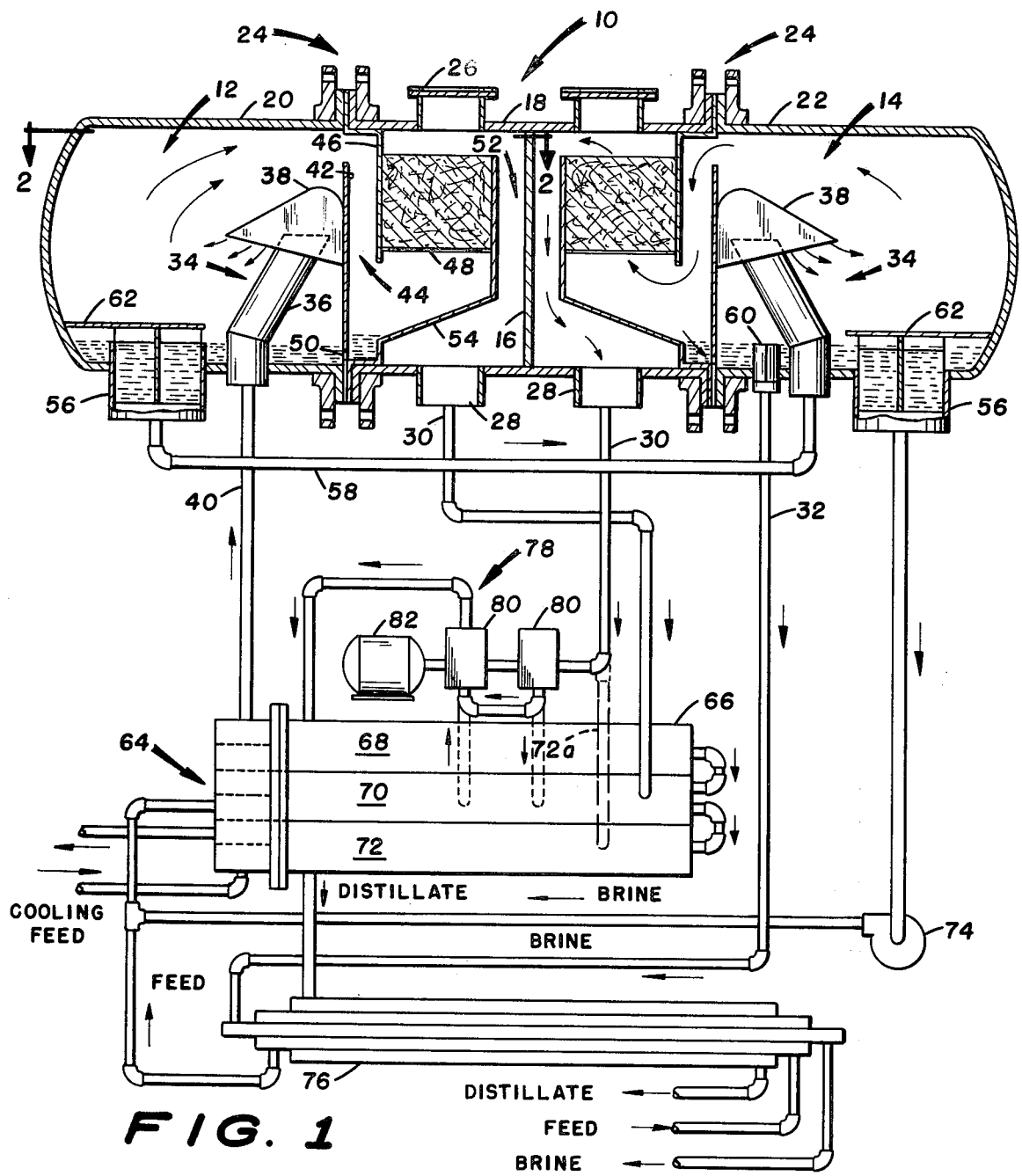
FIG. 1 is a schematic of the present invention, portions thereof being shown in section and material flow paths being diagrammatically illustrated; and, FIG. 2 is schematic of an idealized section taken through line 2—2 of FIG. 1.
Figure 2:
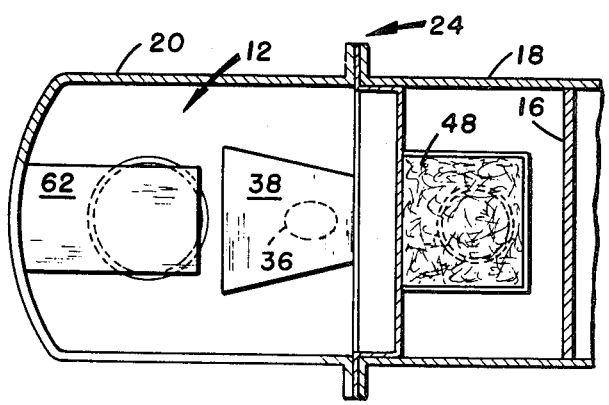

Referring to FIGS. 1 and 2, the basic unit of the present invention is seen at 10 to comprise first and second stage evaporation chambers 12 and 14 conformed generally cylindrically and with a common dividing wall 16. The wall 16 is of a flat conformation but can be fabricated from a relatively light gauge titanium or of a copper-nickel alloy without the need for additional structural strengthening even in high temperature and high pressure operation. The dividing wall 16 is enclosed by and welded to a cylindrical vapor housing 18, which housing 18 is joined along its peripheries and bolted to shells 20 and 22 to define the chambers 12 and 14 respectively, the shells 20 and 22 are also formed of relatively thin ($\frac{1}{8}$") titanium or copper-nickel alloy since said shells are contacted by sea water or other corrosive materials which are being distilled and or concentrated within the chambers 12 and 14. The vapor housing 18, preferably constructed of stainless steel, is bolted on either side thereof to the shells 20 and 22 by means of the flanges 24. Sight windows 26 are provided in the housing 18 to allow inspection of the unit 10. Vapor take-off ports 28 are also provided in the housing 18 for communication with each one of the chambers 12 and 14, the parts ducting through pipes 30 to conventional solo-shell heat exchangers in a fashion to be described hereinafter. As can be seen by those skilled in the art, the unit 10 forms a part of a two-stage recirculating flash plant. It is to be understood that the unit 10 is otherwise useful as a basic "building block" of multi-effect systems of widely varying capacities and having any practical number of stages.

Each of the chambers 12 and 14 are seen to be fitted with a flash device 34 comprised of an entrance pipe 36 and a flash hood 38. The entrance pipe 36 extends into the hood 38 at an angle and receives the heated solute-laden water which is to be distilled from a connecting conduit pipe 40. The flash hood 38 surmounts and is spaced from the horizontally leveled end of the pipe 36, heated water directed from the pipe 36 against the umbrella-like hood 38 flashing vapor into the chamber 12 while the more concentrated unevaporated portion of the chamber 12 and strikes plate 62. As shown by the arrows, the vapor and fine mist created on flashing moves upwardly, the heavier particles of mist ending to move into and combine with the unflashed liquid due to the downward movement required to escape the hood. The vapor thus created and fine droplets of excess liquid then move circuitously toward the upper portion of the chamber 12 and over a division plate 42 which separates that portion of the chamber 12 wherein flashing occurs from the remainder of the chamber 12. The chamber 14, as will be described hereinafter, is fitted with similar structure. The plate 42 additionally has the flash hood 38 mounted thereto. Vapor droplets of excess liquid must move through the opening defined by the shell 20 and the plate 42, downwardly through a vapor passage 44 defined by the plate 42 and a passage plate 46, and subsequently upwardly to pass through a mesh 48. This circuitous path involves an additional upward reversal of direction which, even though the system is under a normal vacuum-induced pull, acts to cause more water droplets to descend into a liquid pool in the lower portion of the chamber 12. The pool of liquid beneath the passage 44 and mesh 48 communicates through a limber hole 50 to the liquid pool in the flash portion of the chamber 12. Any mist or excess liquid droplets not removed from the vapor is caught by or condensed on the mesh 48 prior to movement of the vapor downwardly through an exit passage 52 defined by a convoluted support plate 54 and the dividing wall 16. The vapor exits the chamber 12 through the vapor take-off port 28 which connects to the pipe 30 for ducting of the vapor to the heat exchanging condensors to be described hereinafter. The support plate 54 is integrally formed with the division plate 42 for ease of fabrication and mounts the mesh 48 on the side thereof opposite from the passage plate 46. Thus, the flash hood 38 and the mesh 48 are mounted by and to unitary connecting structure formed of the division-plate 42, the passage plate 46, and the support plate 54. The structural assembly thus formed is mounted between the shell 20 and the housing 18 by the flange 24.

The level of relatively concentrated liquid is maintained in the chamber 12 by a standpipe 56, the relatively concentrated liquid being ducted from the standpipe 56 through a conduit pipe 58 to the second stage evaporator chamber 14 wherein the liquid is flashed by means of structure indentical to that used in the chamber 12. Briefly, the relatively concentrated liquid ducted to the chamber 14 from the chamber 12 enters the chamber 14 through entrance pipe 36 and is forced against flash hood 38, the vapor thus flashed following a circuitous path within the chamber 14 and through mesh 48 identical to that path followed in the chamber 12. Vapor exits the chamber 14 through the vapor take-off port 28 and is ducted through pipe 30 to heat exchanging condensors which will be described hereinafter. The chamber 14 is also fitted with a unitary flash hood 38 and mesh 48 assembly held together by division plate 42, passage plate 46, and support plate 54 as described previously. The level of the now even more concentrated liquid in the lower portion of the chamber 14 is maintained by a brine spill-over pipe 60. The pipe 60 in chamber 14 and the standpipe 56 in chambers 12 and 14 are each fitted with deflector plates 62 which are respectively attached to the shells 20 and 22 and extend horizontally over and spaced from the openings of the pipes 60 and 56 to prevent direct entry of liquid deflected from the flash hoods 38. The bulk of the liquor in chamber 14 is recirculated down standpipe 56.

Vapor from the chamber 12 is ducted as previously described through the pipe 30 to a heat exchange unit 64 which may be configured in a variety of ways known in the art. It is particularly suitable to the invention however to fabricate the unit 64 as a three section solo-shell heat exchanger formed with a common water box, the structure being formed of suitable corrosion resistant materials and held within a housing 66 formed of steel. The three sections of the unit 64 essentially comprise a heat input section 68, a heat recovery section 70, and, when desired, a heat reject section 72. A recirculating pump 74 takes suction from the chamber 14 and pumps the concentrated liquid or brine, from said chamber through the heat recovery tube side of section 70 where the relatively cool liquid accepts heat from the vapor entering the shell side of section 70 from the chamber 12. The vapor thus gives up heat and condenses to form pure distillate, the reheated circulating concentrated liquid being pumped through the heat input section 68 and then to the entrance pipe 36 in the first stage chamber 12 for additional flashing of the reheated liquid. The condensed distillate is drained to the heat reject section 72 which can effectively include as shown in FIG. 1 a regenerative heater 76 through which incoming feed liquid is ducted, the feed liquid accepting heat from the relatively hot distillate, the heated feed liquid mixing with the reheated concentrated liquid exiting the heat input section 68 and then being ducted to the first stage chamber 12. The distillate exits the heater 76 at a temperature only slightly higher than that of the incoming feed liquid. A portion of the concentrated liquid from the second stage chamber 14 is also utilized within the regenerative heater 76 to heat incoming feed liquid.

By maintaining a proper heat balance relationship within the system including external heat input in the section 68, the liquid passing from the chamber 12 to the chamber 14 through the conduit pipe 58 is moved therethrough by virtue of the pressure gradient existing through the standpipe 56 to the flash device 34 in the chamber 14. Vapor formed in the chamber 14 is ducted through pipe 30 to and condenses in the heat reject section 72 (by way of the pipe 72a shown in phantom) wherein the heat in the condensed distillate is exchanged with external cooling feed. The unit 64 can be also formed from a multiple of four or more stages employing solo-shell condensors if desired. It is also apparent that the system described could easily be modified to form a "once-through" system without departing from the scope of the invention. It is further to be noted that the system could be configured without the regenerative heater 76, although at a loss of heat efficiency.

The system as shown in FIG. 1 may be configured to employ a vapor compression sub-system 78 which, while not necessary for providing a workable system, does act to increase efficiency. A single stage or multistage compressor could be utilized as the sub-system 78 to take suction from the vapor take-off port 28 in the second stage chamber 14 in order to compress the vapor to a higher pressure and temperature. The second stage solo-shell condensor then serves as a heat input section and the heat reject section 72 is not utilized. Under such circumstances, the first stage condensor serves as a heat recovery section. As shown in FIG. 1, however, the sub-system 78 is preferably comprised of a two-stage split compressor 80 driven by a motor 82, which combination results in a 20% savings in power input (over a single stage compressor) to the sub-system 78. Use of the split compressor 80 thus results in a lowering of the power input to the system as a whole if the interstage crossover is desuperheated by ducting through section 70 as shown in phantom. While the separate stages of the compressor 80 are shown to be arranged in series in FIG. 1, the stages could be arranged in parallel in larger systems employing more than two stages of evaporation. For example, in a six evaporation stage system, a multi-stage compressor 80 would pump progressively up the stages with low compression ratios and desuperheating between stages. Increased efficiencies result with arrangements of either type due to the large reduction in size of the expensive compressor apparatus and also to the increased heat transfer surface effectiveness of the system as a whole, the surface effectiveness being increased by as much as a factor of two over similar systems.

The system thus described may be employed as shown in FIG. 1 or may be combined into larger sytems wherein incoming liquid feed is treated prior to entry of the feed into the unit 10. For example, incoming liquid feed may be treated in a first effect comprised of a submerged tube arrangement such as is generally known in the art, the chambers 12 and 14 then comprising second and third effects of such a system. Incoming feed passing through a submerged tube topping effect can be conveniently heated therein by "waste heat" water such as from the engine cooling jacket aboard a ship. As can be seen, the invention may be practiced other than as specifically described without departing from the intent of the teachings herein to be found or from the scope of the appended claims.

What is claimed is:
1. Flash evaporation apparatus comprising:
housing means comprising at least two opposed cylindrical shells and a central cylindrical vapor housing disposed between the opposed shells, the shells and the vapor housing being aligned in a horizontal disposition, the shells and the vapor housing having mating means for respectively joining the inner end of each of the shells to opposite outer ends of the vapor housing;
a wall member centrally disposed within the vapor housing and spaced from the outer ends of the vapor housing, the wall member being continuous to prevent communication between the shells through the vapor housing and to define two opposed and aligned housing chambers within the housing means, the housing chambers commonly sharing the wall member at innermost ends thereof;
entrance pipe means for carrying solute-laden liquid into portions of each of the housing chambers and directing the liquid thereinto in a generally upward flow path, the liquid not contacting the wall member;
a liquid flash and separator means disposed within each housing chamber adjacent to the wall member, the liquid flash and separator means separating outermost portions of each of the housing chambers from the vapor housing;
condensation means disposed within the housing means on either side of the wall member and between the wall member and the liquid flash and separator means for condensing the vapors exiting the housing chambers to a relatively pure distillate;

means for ducting the vapors to the condensation means; and, means communicating the first housing chamber to the second housing chamber and ducting the relatively more concentrated effluent from the first chamber to the second chamber through the liquid flash and separator means in said second chamber.

2. The apparatus of claim 1 wherein the liquid flash and separator means each comprise:

plate means disposed within each housing chamber in alignment with the mating means, the plate means being fixed to inner walls of each housing chamber, each of the plate means having an aperture in the upper portion thereof and respectively defining, along with each of the cylindrical shells, a flash chamber in the outermost ends of each of the housing chambers, the heated solute-laden liquid being introduced by the entrance pipe means into each of the flash chambers and being at least partially flash evaporated therein to produce vapor, suspended droplets of the liquid, and a relatively more concentrated liquid effluent, the vapor and at least a portion of the suspended droplets of the liquid thus produced moving upwardly through the aperture in each of the said plate means;

support means joined to the plate means on the inner side thereof, portions of the support means and portions of the inner side of the plate means defining a first vapor passage within that portion of each of the housing chambers defined by the plate means, the vapor housing, and the wall member, the first vapor passage extending downwardly from the aperture in said plate means on a first side of the support means and then upwardly on the opposite side of the support means to cause two reversals of flow of the vapor, other portions of the support means being spaced from the wall member to define a second vapor passage therebetween;

mesh means supported by the support means and disposed between the first vapor passage and the second vapor passage and held by the support means at a location above the second reversal of flow in the first vapor passage, the first vapor passage and the second vapor passage communicating through the mesh means to define a circuitous path which vapor and liquid droplets must follow to exit the housing chambers, the mesh means acting to trap liquid droplets and to pass vapor therethrough, vapor rising through the mesh means reversing direction to move downwardly through the second vapor passage; and, hood means disposed within each of the flash chambers and being affixed to the outer side of the plate means, the hood means being spaced from and opposing the upper end of the entrance pipe for receiving the liquid directed from said pipe means and for diverting the flow of said liquid into the lower portions of the flash chambers, in the form of a sheet of liquid, the liquid being thereby subjected to turbulence and accordingly flashing off a portion of its means as vapor from both upper and lower portions of the sheet of liquid emanating from the hood means.

3. The apparatus of claim 2 wherein the mating means comprise perimetric flanged lap joint means, the shells being removably affixed thereby to the vapor housing, perimetric edge portions of each of the plate means interposing between the inner end of each of the shells and the outer ends of the vapor housing and being removably coupled therebetween by the said lap joint means, the flash and separator means being removable from each of the housing chambers on disconnection of the lap joint means.

4. The apparatus of claim 2 wherein the liquid flash and separator means is unitary.

5. The apparatus of claim 1 and further comprising split-compressor means for moving the vapors emanating from the chambers to the condensation means for condensation thereof and heat recovery therefrom.

6. The apparatus of claim 1 and further comprising standpipe means in the first chamber to maintain the level of solute-laden liquid therein and to drain excess liquid to the second chamber for flashing of the liquid.

7. Flash evaporation apparatus comprising:

housing means comprising at least two opposed cylindrical shells and a central cylindrical vapor housing disposed between the opposed shells, the shells and the vapor housing being aligned in a horizontal disposition, the shells and the vapor housing having mating perimetric flanged lap joint means for respectively joining the inner end of each of the shells to opposite outer ends of the vapor housing, the shells being removably affixed thereby to the vapor housing;

a wall member centrally disposed within the vapor housing and spaced from the outer ends of the vapor housing, the wall member being continuous to prevent communication between the shells through the vapor housing and to define two opposed and aligned housing chambers within the housing means, the housing chambers commonly sharing the wall member at innermost ends thereof;

entrance pipe means for carrying solute-laden liquid into outermost portions of each of the housing chambers and directing the liquid thereinto in a generally upward flow path, the liquid not contacting the wall member;

a unitary liquid flash and separator means disposed within each housing chamber adjacent to the wall member, the flash and separator means each comprising;

plate means disposed within each housing chamber in alignment with the lap joint means, perimetric edge portions of each of the plate means interposing between the inner end of each of the shells and the outer ends of the vapor housing and being removably coupled therebetween by the said lap joint means, the flash and separator means being removable from each of the housing chambers on disconnection of the lap joint means;

each of the plate means having an aperture in the upper portion thereof and respectively defining, along with each of the cylindrical shells, a flash chamber in the outermost ends of each of the housing chambers, the heated solute-laden liquid being introduced by the entrance pipe means into each of the flash chambers and being at least partially flash evaporated therein to produce vapor, suspended droplets of the liquid, and a relatively more concentrated liquid effluent, the vapor and at least a portion of the suspended droplets of the liquid thus produced moving upwardly through the aperture in each of the said plate means, support means joined to the plate means on the inner side thereof, portions of the support means and portions of the inner side of the plate means defining a first vapor passage within that portion of each of the housing chambers defined by the plate means, the vapor housing, and the wall member, the first vapor passage extending downwardly from the aperture in said plate means on a first side of the support means and then upwardly on the opposite side of the support means to cause two reversals of flow of the vapor, other portions of the support means being spaced from the wall member to define a second vapor passage therebetween, mesh means supported by the support means and disposed between the first vapor passage and the second vapor passage and held by the support means at a location above the second reversal of flow in the first vapor passage, the first vapor passage and the second vapor passage communicating through the mesh means to define a circuitous path which vapor and liquid droplets must follow to exit the housing chambers, the mesh means acting to trap liquid droplets and to pass vapor therethrough, vapor rising through the mesh means reversing direction to move downwardly through the second vapor passage, and, hood means disposed within each of the flash chambers and being affixed to the outer side of the plate means, the hood means being spaced from and opposing the upper end of the entrance pipe means for receiving the liquid directed from said pipe means and for diverting the flow of said liquid into the lower portions of the flash chambers, in the form of a sheet of liquid, the liquid being thereby subjected to turbulence and accordingly flashing off a portion of its mass as vapor from both upper and lower portions of the sheet of liquid emanating from the hood means;

means disposed externally of the flash chambers for condensing the vapors exiting the housing chambers to a relatively pure distillate;

means for ducting the vapors in the second vapor passages to the condensing means; and means joining the first chamber to the second chamber and ducting the relatively more concentrated effluent from the first chamber to the second chamber through the liquid flash and separator means in said second chamber.

* * * * *